(12) United States Patent
Wanda

(10) Patent No.: US 7,999,961 B2
(45) Date of Patent: Aug. 16, 2011

(54) INFORMATION PROCESSING APPARATUS, DISTRIBUTED PRINTING CONTROLLING METHOD, STORING MEDIUM AND PROGRAM

(75) Inventor: Koichiro Wanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 12/118,674

(22) Filed: May 9, 2008

(65) Prior Publication Data

US 2008/0218796 A1    Sep. 11, 2008

Related U.S. Application Data

(60) Division of application No. 11/603,881, filed on Nov. 24, 2006, now Pat. No. 7,408,671, which is a continuation of application No. 09/949,715, filed on Sep. 12, 2001, now abandoned.

(30) Foreign Application Priority Data

Sep. 12, 2000  (JP) ................................. 2000-276482
Aug. 28, 2001  (JP) ................................. 2001-257700

(51) Int. Cl.
  *G06F 15/00*    (2006.01)
  *B41J 5/30*    (2006.01)
(52) U.S. Cl. ........................................ 358/1.15; 400/62
(58) Field of Classification Search .............. 358/1.15, 358/1.14, 1.13, 1.2, 1.6, 1.1, 1.9, 452, 1.18; 715/201, 225, 273, 700; 400/61, 62, 70, 400/76; 709/224, 227, 203; 399/81, 16
See application file for complete search history.

(56) References Cited

U.S. PATENT DOCUMENTS

| | | | | |
|---|---|---|---|---|
| 5,287,194 A | * | 2/1994 | Lobiondo | 358/296 |
| 6,213,652 B1 | | 4/2001 | Suzuki et al. | 395/114 |
| 6,498,656 B1 | | 12/2002 | Mastie et al. | 358/1.15 |
| 6,856,413 B1 | | 2/2005 | Roosen et al. | 358/1.15 |
| 6,856,416 B1 | | 2/2005 | Danknick | 358/1.15 |
| 6,970,261 B1 | * | 11/2005 | Robles | 358/1.15 |
| 2002/0027673 A1 | * | 3/2002 | Roosen et al. | 358/1.13 |
| 2002/0101604 A1 | | 8/2002 | Mima et al. | 358/1.15 |

FOREIGN PATENT DOCUMENTS

| | | |
|---|---|---|
| JP | 8-204878 | 8/1996 |
| JP | 8-286895 | 11/1996 |
| JP | 9-016350 | 1/1997 |
| JP | 9-218764 | 8/1997 |
| JP | 10-307694 | 11/1998 |
| JP | 11-149354 | 6/1999 |
| JP | 11-175291 | 7/1999 |
| JP | 11-232056 | 8/1999 |
| JP | 2000-207148 | 7/2000 |

* cited by examiner

*Primary Examiner* — Saeid Ebrahimi Dehkordy
(74) *Attorney, Agent, or Firm* — Fitzpatrick, Cella, Harper & Scinto

(57) ABSTRACT

Control is effected to produce a plurality of child print jobs for a plurality of printers from data to be printed, on the basis of inputted instruction for distributed print, and information regarding a parent print job is produced on the basis of information regarding the plurality of child print jobs produced under control of the distributed print, and the parent job is displayed in a distinguishable manner from the child print job.

19 Claims, 11 Drawing Sheets

FIG. 8

| | PARENT JOB | CHILD JOB | CHILD JOB-1 | CHILD JOB-2 |
|---|---|---|---|---|
| (1) SPOOL PARENT JOB | SPOOLING | | | |
| (2) GENERATE CHILD JOB | WAITING PRINT | SPOOLING | | SPOOLING |
| (3) WAIT PRINT END OF CHILD JOB | WAITING PRINT | WAITING PRINT | | WAITING PRINT |
| | WAITING PRINT | TRANSFERING | | WAITING PRINT |
| | PRINTING | PRINTING | | WAITING PRINT |
| (4) CONFIRM END OF CHILD JOB-1 | PRINTING | PRINT FINISHED (DELETED) | | TRANSFERING |
| | PRINTING | | | PRINTING |
| (5) CONFIRM END OF CHILD JOB-2 | PRINTING | | | PRINT FINISHED (DELETED) |
| (6) FINISH DISTRIBUTED PRINT | PRINT FINISHED (DELETED) | | | |

INFORMATION PROCESSING APPARATUS, DISTRIBUTED PRINTING CONTROLLING METHOD, STORING MEDIUM AND PROGRAM

This application is a divisional application of U.S. application Ser. No. 11/603,881, filed Nov. 24, 2006, now allowed, which is a continuation application of application Ser. No. 09/949,715, filed Sep. 12, 2001, now abandoned, which is incorporated herein by reference.

BACKGROUND OF THE INVENTION

1. Field of the Invention

The present invention relates to an information processing apparatus, a distributed print controlling method, a storing medium and a program, and more particularly, it relates to control effected when printing request from application is performed as distributed print on a plurality of printers, and more specifically, it relates to an information processing apparatus, an information processing method, a storing medium storing a computer-readable program, and such a program, in which operation instruction from an operator with respect to various jobs can positively be executed and the operator can collectively recognize conditions of the respective jobs efficiently.

2. Related Background Art

In conventional techniques, regarding print processing of a document formed by application software using a printing function provided by a general OS (operating system), only print processing is performed for a single printing device in correspondence to one printing instruction, and, when an operator wishes to effect distributed print of the document on a plurality of printing devices, the operator must effect plural printing instructions by designating the number of pages to be distribution-printed with respect to the printing devices to be distributed. In this case, the print processing (output processing of printing instruction with respect to a graphic engine of OS) is effected by means of application by the times corresponding to the number of pages, thereby increasing operator's labor and the processing time of application.

To avoid this, it is considered to propose an arrangement in which, when the distributed print is effected, in consideration of the operator's labor and the print processing time of the application, the printing instruction emitted from the application is spooled and the number of pages is automatically designated to plural printing drivers thereby to emit plural print jobs. In this case, since the processing in which the application outputs the printing instruction may be performed once, the releasing of the application from the print processing is hastened, and, since the distributed print processing can be effected automatically, the operator's labor can be decreased.

In such an arrangement, since the print request is emitted to the plural printer drivers, the plural print jobs are issued. Thus, when display of status of the print jobs and operation of the printing jobs are performed in order that the operator manages the print jobs, the following problems will occur.

First, in spite of the fact that the operator recognizes only one print job, since the plural print jobs corresponding to the number of printing devices to be distributed are issued, the operation and status display of the print jobs cannot be effected as the single distributed print job, and, thus, it is hard to understand for the operator.

Second, when the display of the print jobs is effected so that the operator recognizes the distributed print jobs as the single print job, it is impossible to distinguish print jobs (parent print job and child print job) produced by the distributed print processing from the general single print job.

Third, when the single parent print job to be displayed as the distributed print job and a plurality of child print jobs produced by the distributed print are displayed, in spite of the fact that there is a difference between the different print jobs (parent print job and child print job), the operator cannot easily recognize and perform the operation inherent to the distributed print in the parent print job or the child print job.

Fourth, the distributed print processing always includes original parent print job (or print data), and the original parent print job or a plurality of child print jobs produced by dividing the original parent print job are sent to the printer. However, displays of states of the produced jobs such as a timing for producing the plural child print jobs, a timing for sending the job to the output device, a timing for completing the print processing of the output device and a timing for generating error are not always be synchronized, and there is no means for collectively operating such related jobs and for displaying such jobs efficiently.

SUMMARY OF THE INVENTION

The present invention is made in consideration of the above circumstances, and an object of the present invention is to display a parent print job which is apt to be recognized by an operator and a plurality of child print jobs actually produced so that the operator can distinguish the parent print job from the child print jobs in an arrangement for effecting distributed print. That is to say, an object of the present invention is to provide a managing arrangement in which the distributed print jobs comprised of the print jobs distributed into plural jobs can be recognized as a single distributed print job.

Another object of the present invention is to provide a managing arrangement in which a general print job and a parent print job or child print jobs can easily be distinguished from each other and be operated under a circumstance that the general print job and the parent print job or the child print jobs exist.

Further, the present invention aims to correctly control processing to be performed in accordance with operation of print jobs (parent print job and child print job) to be displayed. In other words, a further object of the present invention is to provide an arrangement in which the print job (parent print job or child print job) associated with the operated print job (parent print job or child print job) can be controlled correctly in the operation of the parent print job or the child print job.

An information processing apparatus according to the present invention aims to provide an arrangement in which operation and status display of a parent print job can be performed as a single distributed print job even when child print jobs are issued to a plurality of printing devices to be distributed. To this end, the present invention provides an information processing apparatus for controlling distributed print, comprising distributed print controlling means for controlling to produce a plurality of child print jobs for a plurality of printers from data to be printed, on the basis of inputted instruction for distributed print, and operation controlling means for controlling to similarly operate the plurality of child print jobs corresponding to the parent print job in accordance with operation instruction for the parent print job which is a base for the plurality of child print jobs.

Alternatively, the present invention provides an information processing apparatus for controlling distributed print, comprising distributed print controlling means for controlling to produce a plurality of child print jobs for a plurality of printers from data to be printed, on the basis of inputted instruction for distributed print, producing means for producing status of a parent print job which is a base for the plurality of child print jobs on the basis of respective statuses of the plurality of child print jobs produced under the control of the distributed print controlling means, and display controlling means for displaying the status of the parent print job produced by the producing means.

BRIEF DESCRIPTION OF THE DRAWINGS

FIG. 8 is a view for showing an example of transition of a status of jobs in distributed print processing as a premise of an operating system of the present invention;

DESCRIPTION OF THE PREFERRED EMBODIMENTS

Now, an embodiment of the present invention for applying a print system including an information processing apparatus according to the present invention will be explained.

Figure 1:
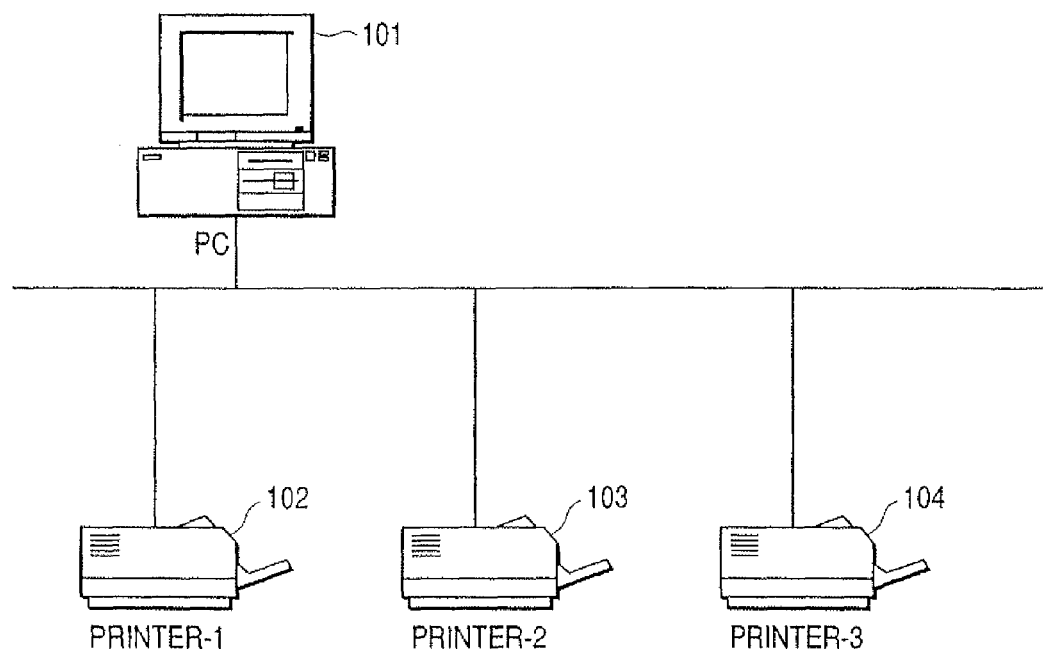
FIG. 1 is a view for showing an example of a printing system to which an information processing apparatus according to the present invention is applied.

FIG. 1 is a constructional view of the print system including the information processing apparatus according to the present invention. The system includes a client computer (also referred to merely as "client" hereinafter) 101 as an example of the information processing apparatus according to the present invention in which a print control program of the present invention is implemented to execute distributed print processing and to which a plurality of printer drivers corresponding to a plurality of printing devices (referred to as "printers" hereinafter) on a network are installed, and printers 102, 103, 104 connected to the network and serve to perform print processing by receiving print jobs from the client 101. In the illustrated embodiment, while an example that the client computer is applied to the information processing apparatus will be explained, the present invention is not limited to such an example, but, for example, a printer server can be applied to the information processing apparatus so that the printer server executes processing similar to processing described below. Further, the print job in the specification means a group of data from job start command to job finish command, and each printer can execute the print processing from print job to print job (and inhibits interruption of other print job). The print data means command for controlling image contents of the print job and the printer. By the printer driver implemented in the client 101, print command (DDI function) received from application via an OS is converted into print date (also referred to as "printer control language" or "page describing language" hereinafter), and the print job including a group of print data is issued to the specific printer. Further, as will be described later, the client 101 as the information processing apparatus of the present invention serves to spool the print command from the application in a predetermined data style (using EMF spool or RAW spool) and to issue a plurality of print jobs by producing processing of the plurality of printer drivers.

Figure 2:
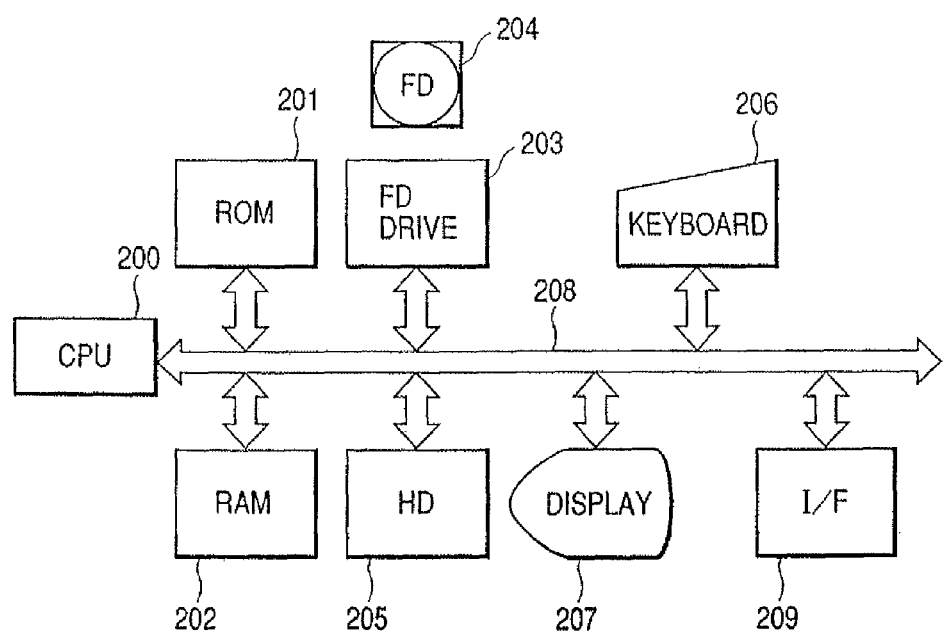
FIG. 2 is a block diagram for schematically showing a function and a construction of the information processing apparatus according to the present invention.

FIG. 2 is a block diagram schematically showing a hardware construction of the client 101 shown in FIG. 1. A CPU 200 serves to control the entire client 101. A ROM 201 stores various programs and data for controlling the client 101, and the CPU 200 executes various processing operations in the client in accordance with the program stored in the ROM 201 or a RAM 202 while utilizing the RAM 202 as a work memory.

Figure 3:
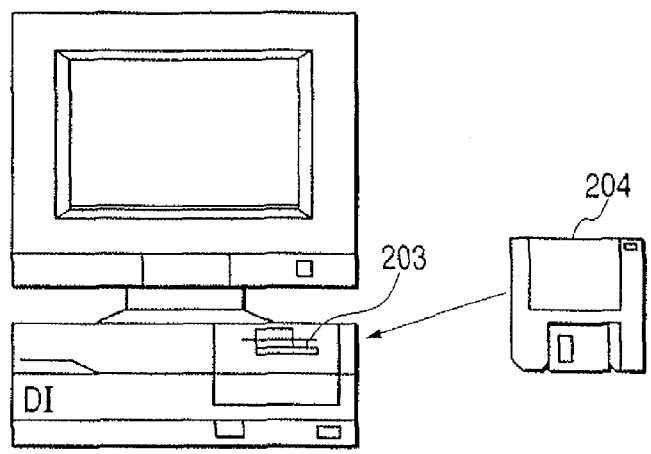
FIG. 3 is a memory map obtained when a program module from a storing medium of the present invention is developed in an RAM 201.

An FD drive 203 has a function for reading-out or writing data (program) from an FD 204 as an example of a storing medium for storing control program according to the present invention. As shown in FIG. 3, the floppy disc (FD) 204 is inserted into the FD drive 203 and input/output of data is performed between the client machine and the floppy disc 204.

Figure 4:
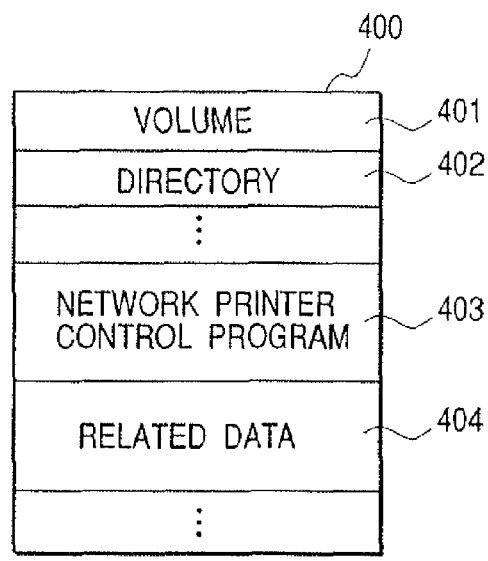
FIG. 4 is a memory map showing data arrangement of the program module in the storing medium of the present invention.

FIG. 4 is a view for showing a memory map of the data in the floppy disc 204. As shown in FIG. 4, the floppy disc 204 stores therein volume information 401, directory information 402, network printer control program for the printers 102 to 104, and related data 404.

Figure 5:
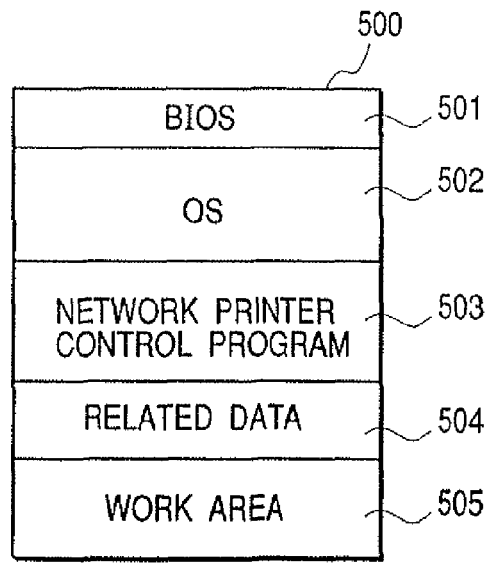
FIG. 5 is a view for showing a relationship between the information processing apparatus and the storing medium of the present invention.

FIG. 5 is a view for showing a memory map obtained when the control program 403 is developed from the floppy disc 204 to the RAM 202. As shown in FIG. 5, the RAM has an area for storing BIOS (basic I/O program) 501, an operating system (OS) 502, a network printer control program 503 developed from the floppy disc 204 and related data 504, and a work area 505.

Returning to FIG. 2, a hard disc (HD) 205 is an example of an external memory. Application software is installed in the HD, and the print control program of the present invention is read-in from the FD 204 via the FD drive 203 and is also installed in the ED 205. A keyboard 206 as an example of an input device has a function for inputting instruction from the operator. Further, as another example of the input device, there is a pointing device such as a mouse.

Figure 7:
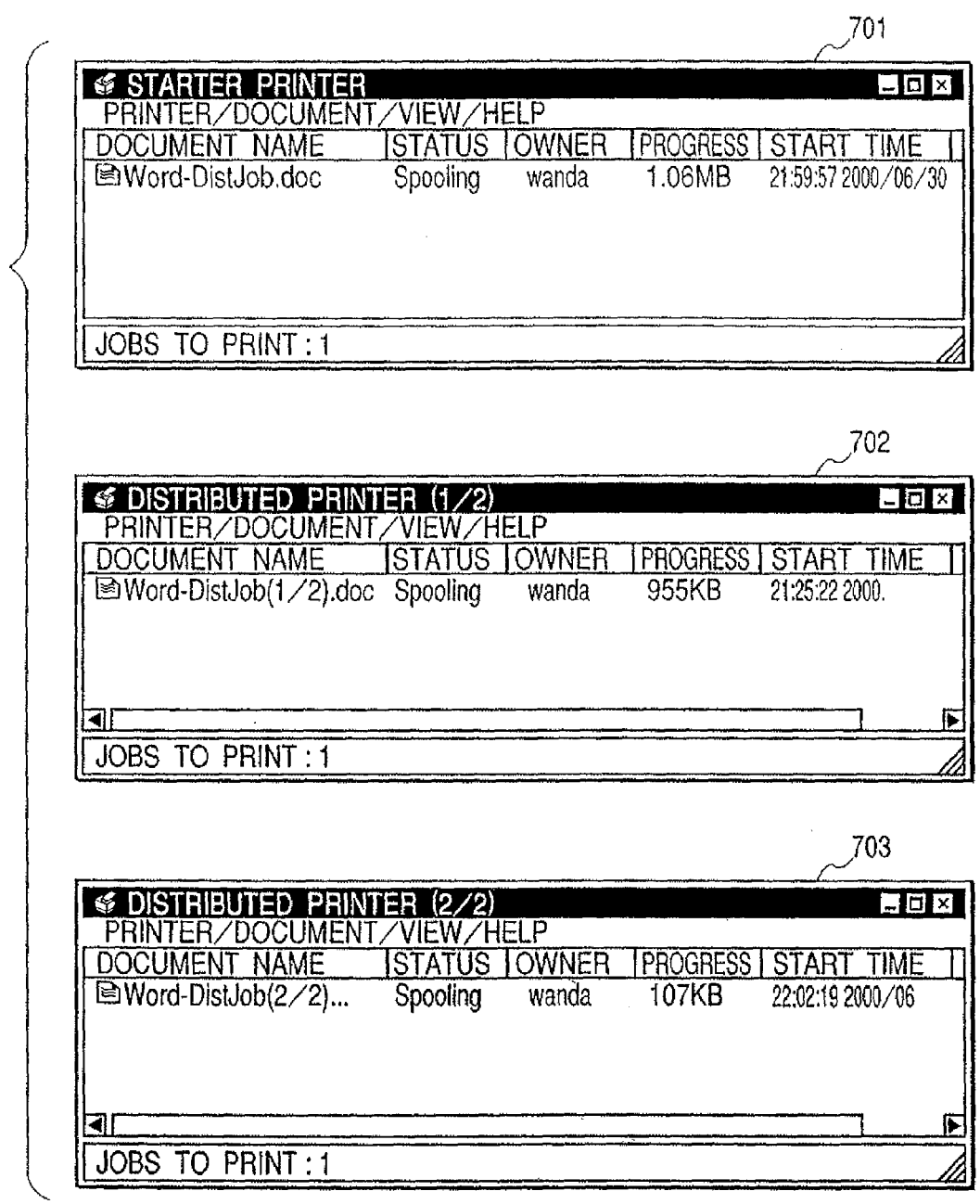
FIG. 7 is a view for showing an example of a displaying method provided by the program module (function) of the present invention.

A display 207 as an example of display means may be a CRT or an LCD and has a function for displaying user interface provided by the print control program on the basis of the OS. Further, the displaying of the display 207 is actually based on instruction of the CPU 200, and a predetermined view or picture plane is displayed by processing a signal based on the instruction of the CPU 200 acting as display controlling means by means of the display 207. Incidentally, a user interface such as shown in FIG. 7 which will be described later can be realized by processing a signal based on the instruction of the CPU 200 by means of the display 207.

An interface (preferably, a network board in the illustrated embodiment) 209 has a function for connecting the information processing apparatus to LAN (local area network) and for effecting communication with an external device.

The above-mentioned elements 200 to 208 (except for the floppy disc 204) are interconnected via a system bus 209 to transmit data therebetween.

Figure 6:
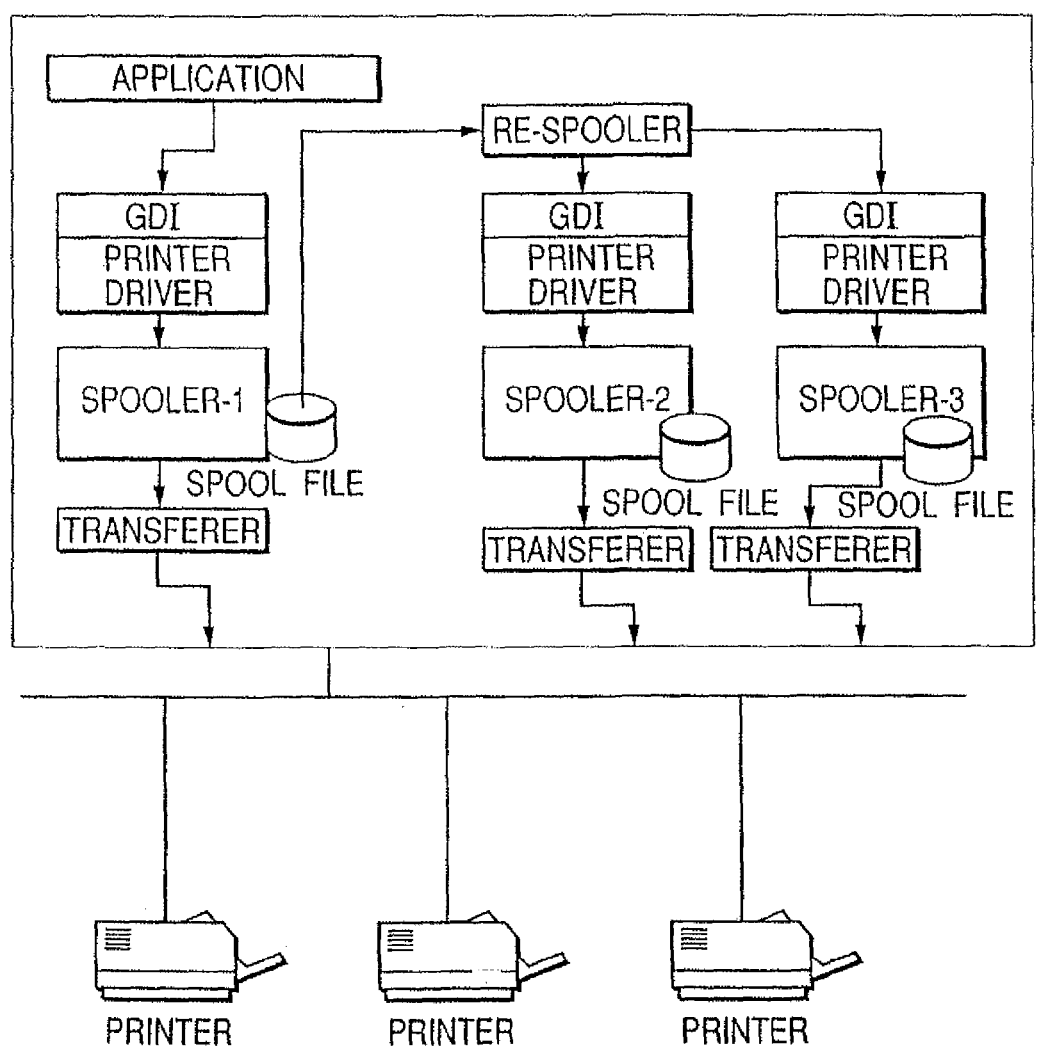
FIG. 6 is a functional block diagram for explaining an example of a print system for realizing operation and display of distributed print of the present invention.

FIG. 6 shows an embodiment of a distributed print system for realizing an operation and displaying method of the distributed print jobs on the basis of the print control program (method) of the present invention. FIG. 6 shows an example which is realized by a spooler of "Windows" (registered trade mark) OS (operating system) and combination of print processing operations. In the present invention, as an embodiment, while a displaying function and the print system on the "Windows" will be explained, the OS may be one other than the "Windows", and the spooler is not limited to the spooler of the "Windows".

Further, regarding the distributed print method relating to the operation system of the present invention, so long as the distributed print processing is effected with respect to a plurality of printers on the basis of one print instruction from the application, specification of hardware of the OS and the distributed print method designating the type of distribution are not particularly limited. That is to say, a distribution method in which child print jobs for plural printers are produced and outputted on the basis of a parent print job can be applied to the present invention. For example, the distribution method may include part number distribution in which a predetermined number of parts are assigned for each plural output, or page distribution in which a predetermined number print pages are assigned for each output, or distribution method in which, in accordance with a print condition such as operator's usage or color/monochromatic print as one of page distributions, output recipient device is determined and distributed.

In FIG. 6, in application software (referred to merely as "application" hereinafter) having a function for forming a document (including document style, table style, image file, DTP and the like), the operator can instruct the distributed print. For example, a single imaginary printer driver (referred to as "distributed print driver" hereinafter) is previously formed for distributed print. The distributed print driver has a module for actually calling-out a plurality of printer drivers, and, when the print command is received, it spools the print command as a predetermined data pattern (for example, EMF: enhanced meta-file) and automatically distributes the print command and requests printing to the plurality of printer drivers set by the print driver. Although the print command itself transferred to the respective drivers is entire print command, since the number of pages is designated in the command, the processing for producing the print data regarding the designated page number in each printer driver.

In FIG. 6, when the operator instructs the printing of the document from the application with respect to the distributed print driver, the application outputs the print command (GDI function) to a GDI as a graphic engine of the OS. Further, an EMF spooler exists between the application and the GDI, and contents of the print command outputted from the application is spooled in EMF of binary type. Incidentally, since EMF is well-known in OS of the "Windows", explanation thereof will be omitted.

The GDI as the graphic engine of the OS converts the print command into print command (DDI function) which can be interpreted by the printer driver to which the output is sent and transfers the processing to such a driver. The printer driver produces print data of required page number on the basis of the print command (DDI function) obtained from the GDI and the designated page number and outputs the print data to the spooler (RAW spooler). The spooler 1 outputs the spooled print data for each predetermined unit to the printer connected to the RAN via a transferring portion, with the result that the printing is effected by the predetermined printer.

Further, here, in order to simplify the explanation, regarding the spooler 1, the RAW spooler for spooling the print data and the EMF spooler for spooling the EMF type data before it is transferred to the GDI are explained in the same manner. When detailed explanation is made, as mentioned above, since the EMF spooler is spooled on the basis of the data outputted from the application, it exists before GDI. The ENF type data spooled in the EMF spooler is transferred to a re-spooling portion (one module of the print control program) together with the page number. In order to produce the print data by means of a second printer driver corresponding to the printer to be distributed, the print command is again outputted to the printer driver together with the page number via the GDI, thereby outputting the print data to the printer via the spooler 2. Further, if necessary (when the data is distributed to three or more printers), in order to produce the print data from the re-spooling portion by means of a third printer driver, the print command is again outputted to the printer driver together with the page number via the GDI, thereby outputting the print data to the printer via the spooler 3.

Further, in the print system shown in FIG. 6, while an example that the EMF is utilized as the spool file was explained, when the printers for effecting the distributed print are same type printers, since the printer languages of the print data are same, the RAW spooler can be used. In this case, when the first print data is produced by the printer driver, all of the pages are produced, and the number of pages is designated for each of the printers to be distributed, thereby effecting the printing.

By automatically effecting the distributed print in this way, since the operator's labor is reduced and the outputting of the print command from the application can be performed only once, releasing from the print processing is hastened and distributed print which can easily be performed by the operator can be provided.

FIG. 7 shows an example of display of printer object of the distributed print job (being distribution-print-processed) to be operated and displayed. The processing for acquiring the status of each print job is the same as the processing for acquiring the status of the normal print job and can be performed by any means. For example, the status may be acquired by effecting pouring directly from the client with respect to a print server or a printer (not shown) or status notice may be received from the print server or the statuses of the parent print job and the child print job of the distributed print job can be recognized on the basis of the statuses of the respective print jobs obtained in this way. The parent print job is the distributed print job itself based on the print command requested by the application and the child print jobs are the actual print jobs distributed to the respective printers in the distribution print job. More specifically, the parent print job is a job corresponding to that produced on the basis of the print command requested by the application and held as the spool file, and, although the spool file corresponding to the parent print job corresponds to, for example, the above-mentioned EMF, the present invention is not limited to such spool file, but, so long as a file can be converted into PDL, even when a plurality of printers corresponding to different page describing languages are a target, the child print jobs can be produced and can be applied to the present invention.

Further, the child print job corresponds to a print job including print data produced on the basis of the instruction of the distributed print driver by the printer driver corresponding to the printer to which the spool file (corresponding to a file of type which can be converted into PDL; for example, corresponding to EMF) is further distributed via the re-spooling portion.

The reference numeral 701 shows an example of a user interface view for effecting display and operation regarding the original parent print job. The user interface view (referred to as "UI" hereinafter) is provided by the print control program by performing double-click of an icon of the distributed print driver and displayed on the display. In the UI, the status (state) of the parent print job is displayed as "spooling". The "spooling" means that the print data is spooled (transferred and stored in a memory of the printer) with respect to the printer. Other conditions includes "waiting print", "printing", "print finished (deleted)" and "error generated". Further, in the UI in the example 701, for example, when a menu (not shown) of "printer to be distributed" is selected from "printer (P)", the following dialogues (UI) 702, 703 are displayed.

The reference numerals 702, 703 are examples of user interface views (dialogue boxes) for effecting display and operation regarding the child jobs produced from the original job by effecting the distributed print processing with respect to two output devices. In this way, since only the corresponding child print jobs can be extracted from UI of the parent print job, the operator not only can easily recognize the present condition of the entire distributed print processing but also can easily extract information regarding the plurality of child print job corresponding to the parent print job. As a result, even under a circumstance in which the child print jobs are mixed with and processed together with the general print jobs in the predetermined printer, the operator can easily distinguish the child jobs associated with the parent print job. Incidentally, the displaying of the child print jobs is not limited to the above-mentioned example. In the above examples 702, 703, while the states of the child print jobs corresponding to the parent print jobs were displayed in different frames, of course, a list of plural child print jobs corresponding to the parent print jobs can be displayed in a single frame. Further, in this case, the list of plural child print jobs displayed in the single frame corresponds to a list for displaying recipients and states of child print jobs designated by UI on which a list of plural parent print jobs is displayed and corresponding to the plural respective child print jobs extracted in correspondence to the predetermined parent print job.

It should be noted that the status (state) of the parent print job in the example 701 shown in FIG. 7 does not represent the status itself of the print data produced as the original but represents an imaginary status produced by combining the respective statuses of the plural child print jobs divided and produced from the original print data. By providing the imaginary status of the parent print job to the operator, for example, the operator can easily know a condition such as whether the entire distributed print processing is completed or not, without recognizing the respective statuses of the plural divided child print jobs. That is to say, the parent print job may merely be grasped in order to know the printing condition of one document print-instructed by the operator, even in any distributed print method and even how many child print jobs are produced and which conditions is given to such jobs.

In this way, by displaying the dialogue box of the imaginary printer driver, the operation and status display of the parent print job in the distributed print can be effected, and, further, the status display and operation of the child print jobs can be effected by displaying the dialogue box of the printer to be distributed, with the result that the operator can clearly understand the display of the distributed print job and can easily understand the operation of each job.

FIG. 8 is a table showing an example of status transition of the original parent print job (called as "parent job" in FIG. 8) and the child print jobs divided by the distributed print (called as "child job" in FIG. 8). As mentioned above, the original print job is referred to as the parent print job and the jobs produced by the distributed print processing are referred to as the child print jobs. In the information processing apparatus according to the present invention, the status of the parent print job is determined by a combination of the respective statuses of the plural child print jobs. As a result, the present status of the distributed print job can easily be grasped by recognizing the status of the parent print job without understanding the respective statuses of the child print jobs which are not synchronized. Further, the statuses are not limited to those shown in FIG. 8, but, for example, an error status may be included. In this case, the present invention may have a control arrangement in which the status of the parent print job is regarded as "error" if any one of the child print jobs becomes the error status. Hereinbelow, in the explanation of the illustrated embodiment, regarding the print jobs, the parent print job is distinguished from the child print job.

Now, the characteristics of the present invention will be explained.

The information processing apparatus (client 101) according to the present invention serves to control distributed print and comprises distributed print controlling means for effecting control (processing of a print control program to transfer EMF data to respective printer drivers while designating page numbers) to produce a plurality of child print jobs for a plurality of printers from print data to be printed (GDI function as print command outputted from application, or corresponding EMF data) by using the printer drivers for causing the printers to print, on the basis of distributed print command (print instruction to distributed print driver) inputted to the print control program by an operator, display controlling means for displaying statuses of the plurality of child print jobs (examples 702, 703 in FIG. 7) produced in accordance with the control of the distributed print controlling means and a status of the parent print job (example 701 in FIG. 7) which is a base for the plurality of child print jobs in such a manner that these statuses can be recognized (in the illustrated embodiment, dialogues are divided. Further, the parent print job may be displayed as classification "parent" in a list of the child print jobs, which will be described later), and operation controlling means for effecting control (processing described in connection with FIG. 9 and so on) in such a manner that the plurality of child print jobs corresponding to the parent print job are similarly operated.

Figure 9:
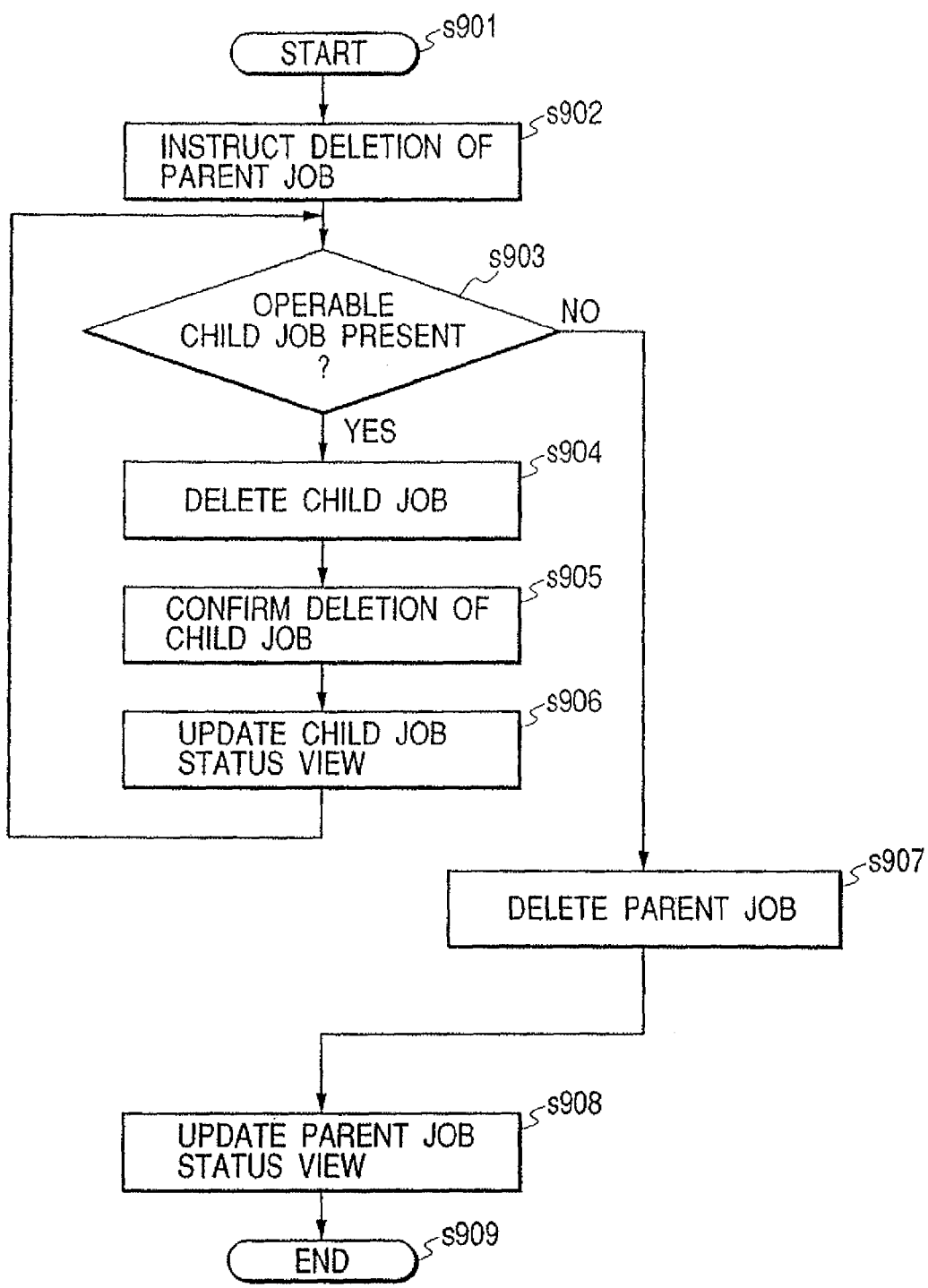
FIG. 9 is a flow chart showing a sequence of deleting processing for an original job of the present invention.

Further, the operation of the print job in the operation controlling means may be a deleting operation (flow chart shown in FIG. 9).

Further, the deleting control in the operation controlling means may be control wherein, if the associated child print job is stored in a memory of the information processing apparatus, such child print job is deleted from the memory, and, if the associated child print job is sent to the printer, instruction of deleting is instructed to the printer.

Further, the operation of the print job in the operation controlling means may be an interrupting operation.

Further, the interrupting control in the operation controlling means may be control wherein, if the associated child print job is stored in a memory of the information processing apparatus, such child print job is interrupted, and, if the associated child print job is sent to the printer, instruction of interruption is instructed to the printer.

Further, the display controlling means may provide a user interface for recognizing the status of the parent print job.

Further, the display controlling means may display a list of statuses of all of the child print jobs produced from the parent print job by the distributed print processing when displaying instruction for the child print jobs is effected in the user interface by designating the parent print job.

FIG. 9 is a flow chart showing a sequence for collectively deleting the child print jobs by instructing deletion while designating the parent print job in the job operation using the print control program of the present invention. Now, the detailed sequence will be described with reference to FIG. 9. Incidentally, although the processing of each step in flow charts shown in FIGS. 10, 11 and 12 which will be described hereinbelow is realized by reading-in a program code stored in non-volatile storing means such as the ROM 201 or the HD 205 by means of the CPU 200 of the information processing apparatus and by effecting the processing in accordance with the read-in program code, if a part of the flow chart or all of the steps in the flow chart is processed by the print server or the printer, a CUP of the server or the printer reads-in the program code stored in the non-volatile storing means each time and the processing is effected in accordance with the read-in program code.

In a step S901 in FIG. 9, the processing in the flow chart of FIG. 9 is started. Such starting may be initiated, for example, when the job is subjected to the distributed print processing so that the parent print job and the child print jobs are UI-displayed by using the dialogue boxes as shown in FIG. 7. In this case, the status of each job may be any status so long as the job can be deleted.

In a step S902, if the operator designates the parent job on the UI by using an operating portion such as a mouse or a keyboard and instruction for deleting the parent print job from a "deleting menu" (not shown) of "document" on the UI is inputted by a "del" key, in a step S903, a print system (print control program) managing the designated parent print job judges whether the deletion-instructed job is the parent print job of the distributed print processing or not, and an operable child print job is present or not, by referring management information (managed by the RAM 202) of the child print job accompanying with job management information (managed by the RAM 202) of the deletion-instructed parent print job. For example, if the designated job is the parent print job and if the child print job which has no deleting condition due to the fact that the print processing is initiated by the functions of the printing devices (printers 102 to 104), i.e., there is an operable child print job, the program goes to a step S904; whereas, if the designated job is not the parent print job or if there is no operable child print job, the program goes to a step S907.

Figure 13:
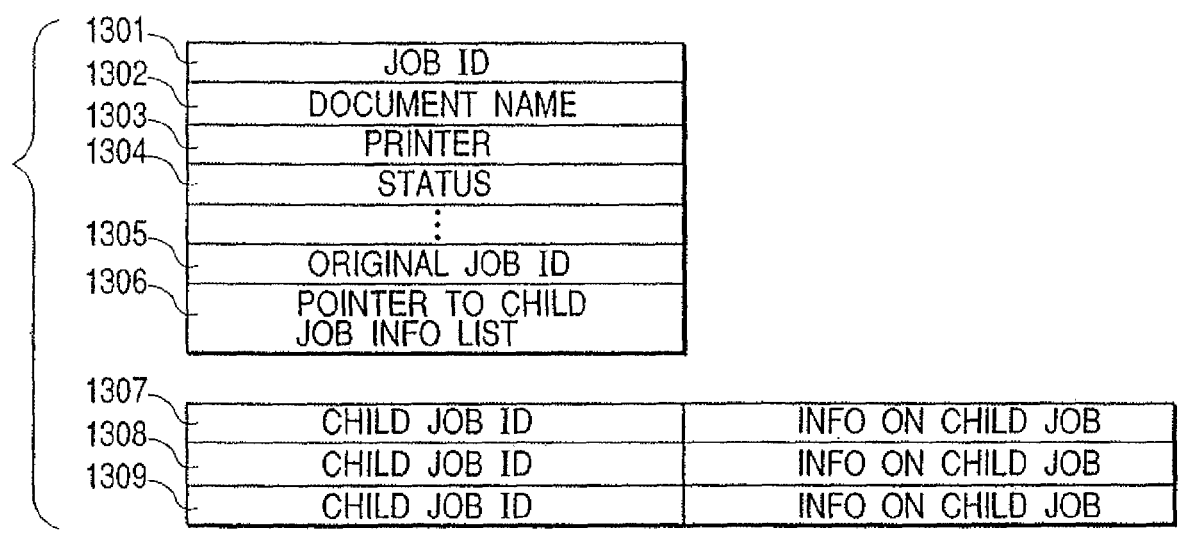
FIG. 13 is a view for showing an example of job managing information.

The processing in the step S903 will be described further in detail. FIG. 13 shows a concrete example of the job management information referred by the information processing apparatus in the step S903. FIG. 13 shows a part of the job management information of the present invention, wherein the reference numeral 1301 denotes job ID for distinguishing the job; 1302 denotes a name of the print job; and 1303 denotes a name of the printer in which the job is spooled. The reference numeral 1304 denotes a status relating to the job such as an operating condition or an error generating condition. Further, the reference numeral 1305 denotes original job ID. The reference numeral 1306 denotes a pointer for a child job information list. Job information of the child print job is stored in address designated by the pointer, and, in case of FIG. 13, information for referring items 1307 to 1309 is stored. In the items 1307 to 1309, IDs of the child print jobs and informations indicating a document name, a status and an output recipient printer name corresponding to each ID are stored.

Here, explaining the job management information for the parent print job and the job management information for the child print jobs in a distinguished manner, in the job management information for the parent print job, a value of the original job ID 1305 in FIG. 13 stores information for distinguishing the job as the original job, such as, for example, "xxxx" because such job itself the original job. The pointer 1306 for the child print job information list stores a pointer for referring respective informations of the plural child print jobs produced on the basis of the print data thereof.

Next, explaining the child print job management information with reference to FIG. 13, the job ID 1301 stores ID of the child print job itself, and the original job ID 1305 stores the parent print job ID as the original job. By referring the job ID 1305, the parent print job corresponding to the child print job can be specified. The pointer for the child print job information list also stores information for distinguishing the job itself as the child print job. Of course, the pointer may store a pointer for referring information such as statuses of child print jobs other than the job thereof. In this case, other child print job can be specified from the child print job management information.

Incidentally, the job management information in the present invention is not limited to the above-mentioned one, but, the parent print job and the child print jobs can refer or update the other information relative to each other, and, the relationship between the parent print job and the child print jobs in the present invention can be realized so long as the respective information updating operations can be effected in a synchronous manner in the data.

Further, the job management informations shown in FIG. 13 can be utilized in processing operations in steps S1003 and S1005 in FIG. 10, in steps S1103 and S1104 in FIG. 11 and in a step S1203 in FIG. 12, which will be described later.

In the step S904, the print control program controls to delete the child print jobs produced from the deletion-instructed parent print job. The deleting processing for the child print job can be effected in a similar manner to a conventional deletion of print job. For example, when the print job is spooled in the client, the deletion of the child print jobs is effected. Further, when the child print jobs are spooled in the print server, the client emits deleting instruction of the desired child print job to the print server. Further, when the job is spooled in the printer, the deleting instruction of the child print job is effected by using the job ID issued from the printer. The deletion of the child print job itself has no characteristic and is the same as the conventional deletion of the print job and can be achieved by any deletion processing method. Here, the characteristic is to recognize the corresponding child print job on the basis of deleting instruction of the parent print job and to control effecting the deletion processing of such child print job.

When the deletion processing of the child print job is effected in the step S904, in a step S905, the print control program (in actual, control of the CPU 200 on the basis of the print control program) updates the management information of the parent print job. For example, the status (waiting print" of the child print job is updated to #deletion finished". After the deletion of the child print job and update of the management information of the parent print job, the program goes to a step S906, where the CPU 200 updates to a condition that the child print job is deleted (for example, the display 702 is deleted), on the basis of the print control program. Then, the program is returned to the step S903, and the sequence from the step S904 to the step S906 is repeated until all of the operable child print jobs are deleted.

In the steps S903 to S906, when all of the operable child print jobs are deleted, the program goes to a step S907, where the CPU 200 deletes the parent print job designated by the operator, on the basis of the print control program. Here, the deleting processing of the parent print job is deletion of the management information managed to display the parent print job and deletion of the spool file (file corresponding to EMF data) spooled to produce the distributed print job.

In a step S908, the status display of the parent job deleted in correspondence to the step S907 is updated (corresponding to the deletion of the list of the parent job of FIG. 9), thereby finishing the deleting processing. For example, in case of the display of the parent print job in the example 701 of FIG. 7, the update is effected to a condition that one of the jobs is deleted and then the deleting operation is finished. In the step S903, if there is no child print job being managed, as it is, in the step S907, only the designated job is deleted, and, in the step S908, the display information of the job is updated, and then, the deleting operation is finished.

Incidentally, the interrupting operation can be realized in the similar manner, except for judgement of the deleting processing of the job.

Further, even information relating to the job such as setting of priority of job can be updated in the similar manner so long as the information is information of the child print job associated with the parent print job.

Figure 10:
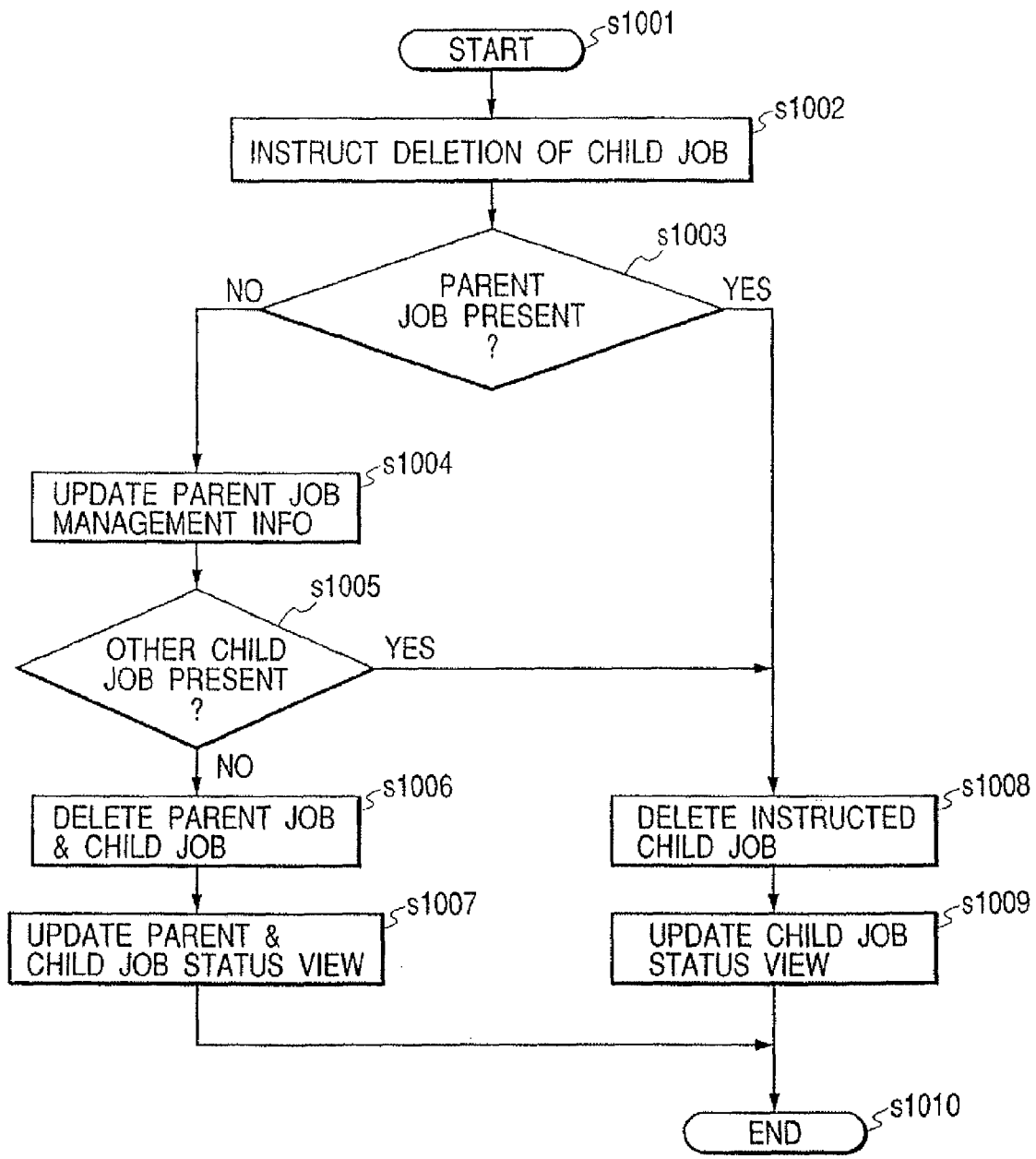
FIG. 10 is a flow chart showing a sequence of deleting processing for a print job produced by distributed print processing of the present invention.

FIG. 10 is a flow chart showing a sequence for deleting the parent print job when all of the child print job are deleted.

In a step S1001, the processing in the flow chart of FIG. 10 is started. Such starting may be initiated, for example, when a certain job is subjected to the distributed print processing so that the parent print job and the child print jobs are displayed as shown in FIG. 7. In this case, the status of each job may be any status so long as the job can be deleted.

In a step S1002, if the instruction of deletion of the job regarding the child print job as shown in the example 702 in FIG. 7 is inputted, in a step S1003, the print system in which the deletion of the job is instructed judges whether there is the parent print job producing such a job by using the job management information shown in FIG. 13 while referring the child job management information. That is to say, it is judged whether a job having ID corresponding to the original job ID shown by 1305 in FIG. 13.

If there is the parent print job, the child job information relation to the parent job in the parent job management information is distinguished, and the status is updated to "deletion finished" (step S1004). In the child job management information (corresponding to 1307-1309 in FIG. 13) included in the updated parent print job, if other jobs are all deleted by any operation or the print finishing (NO in a step S1005), in a step S1006, it is regarded that one distributed print processing is completed, and both the child print jobs deletion-instructed by the operator and the parent print job producing such child print jobs are deleted. Then, in a step S1007, the display of the child print jobs and the parent print job is updated, and, in a step S1010, the deleting processing is finished. In the step S1010, in a printer object as shown by the example in FIG. 7, one parent print job and the produced child print jobs are all deleted.

In the step S1005, if another child job is not deleted, the program goes to a step S1008, where only the child print job deletion-instructed is deleted, and, in a step S1009, only the display of the child print job is updated, and then the processing is finished. Further, as the processing in the step S1009, although not shown in the flow chart, the status of the parent print job may be updated in accordance with the rule as shown in FIG. 8 in dependence upon a combination of the statuses of the updated child print job and other child print job as the status of the child print job is updated in the step S1008. For example, if the status of the child job 1 in FIG. 8 is "transferring" and the status of the child job 2 is "waiting print", when the child job 2 is deleted, the status of the parent print job is updated from "waiting print" to "printing", and the UI display is also updated as the status is updated.

Further, in the step S1003, if there is no parent print job, only the job instructed in the sequence in the step S1008 is deleted, and, in the step S1009, the updated is effected to display in which the instructed job is deleted, with the result that the operator can execute the operation without effecting special operation, similar to the general job.

In this way, according to the present invention, since the flow charts as shown in FIGS. 9 and 10 can be realized, for example, the plurality of child print jobs produced and distributed to the plural printers under the LAN circumstance, and the child print jobs distributed from the child print job to the parent print job or another printing devices can be operated collectively, thereby providing more easy printing condition to the operator.

Figure 11:
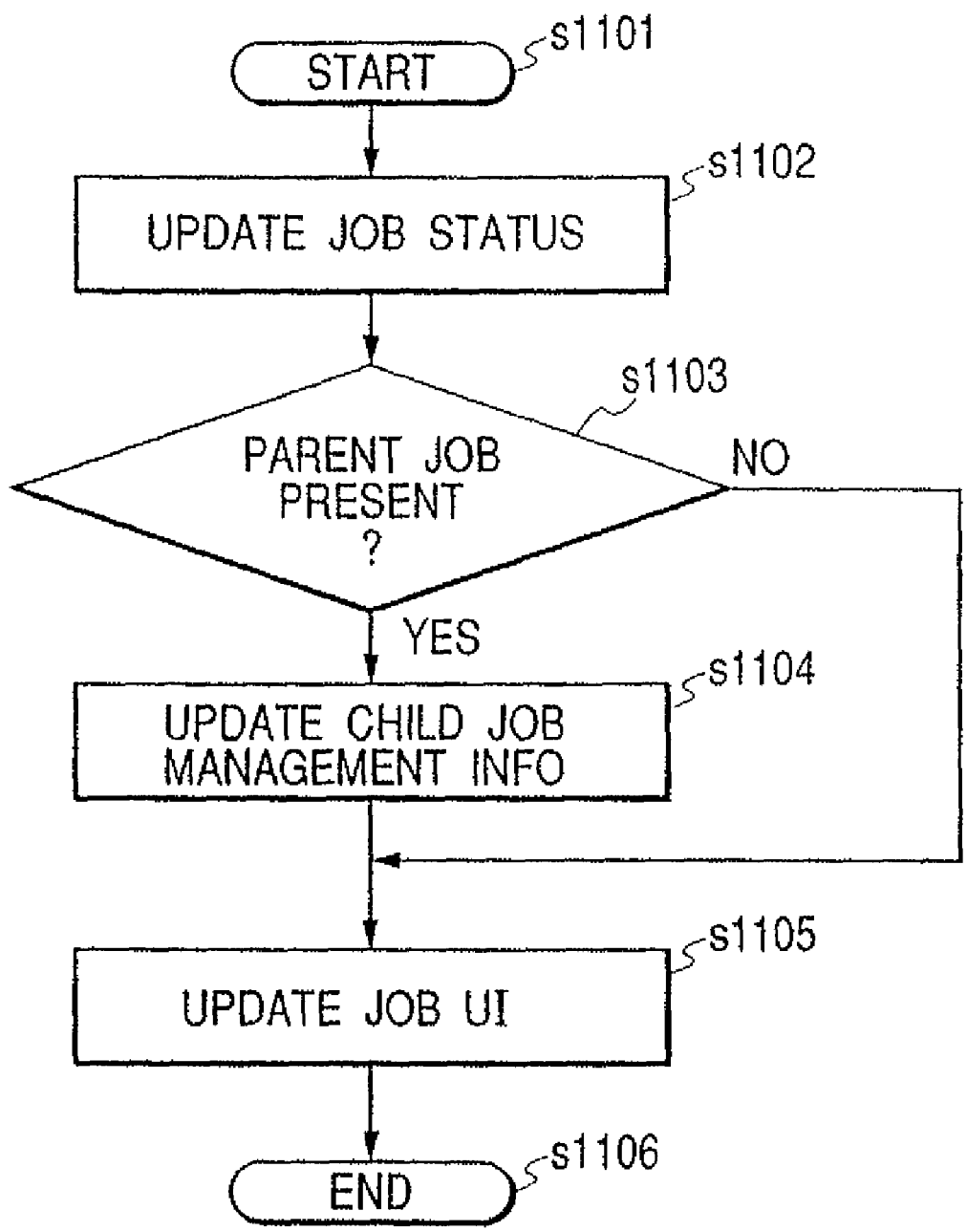
FIG. 11 is a flow chart showing a sequence for updating information of a job produced by the distributed print of managing information of the original job of the present invention.

FIG. 11 is a flow chart showing a sequence for notifying to the parent print job when the information or status of the child print job is updated.

In a step S1101, the processing in the flow chart of FIG. 11 is started. Such starting may be initiated when the information of the child print job is updated (for example, the status is updated from "waiting print" to "printing").

In a step S1102, the status of the job is updated by the operator's input. The operator's input may be, for example, input instructing interruption of processing of the job to be operated via UI. Further, if an error is generated in any one of the information processing apparatus, printer server and printer, information notifying the error is automatically sent from the device in which the error was generated to an information processing apparatus (personal computer manipulated by the operator), and, in the step S1102, the job management information of the child print job is updated on the basis of the notified information.

In a step S1103, the CPU 200 judges whether there is the parent print job from the job management information in which the status was updated, if the job the status of which was updated is the child print job. Actually, in such judgement, the judgement of the presence of the parent print job is effected by judging whether there is the job corresponding to the original job ID 1305 in FIG. 13 while referring such ID.

If there is the parent print job, in a step S1104, from the child job management information included in the parent print job, the information thereof is retrieved by the job ID and the status corresponding to ID thereof in the management information is updated. After the processing in the step S1104 is finished, in a step S1105, display of UI of the job the status of which was updated is updated, and the processing is finished. The update of the display of UI in the step S1105 may be update of display of UI corresponding to the child print job or update of display of UI of the parent print job upon updating the status of the child print job based on the manner explained in connection with FIG. 8.

In case of update of the job management not including the parent print job, the program goes from the step S1103 to the step S1105, and only the display of the job the information of which was updated is updated. Here, as a circumstance in which there is no parent print job, for example, under a condition that the child print job is produced in another information processing apparatus different from the information processing apparatus for producing the parent print job, when instruction of deletion of the child print job is inputted from another information processing apparatus, if the communication with the information processing apparatus for producing the parent print job is impossible for any reason, the presence of the parent print job cannot be recognized from another information processing apparatus. Further, this is also true in FIG. 10.

Figure 12:
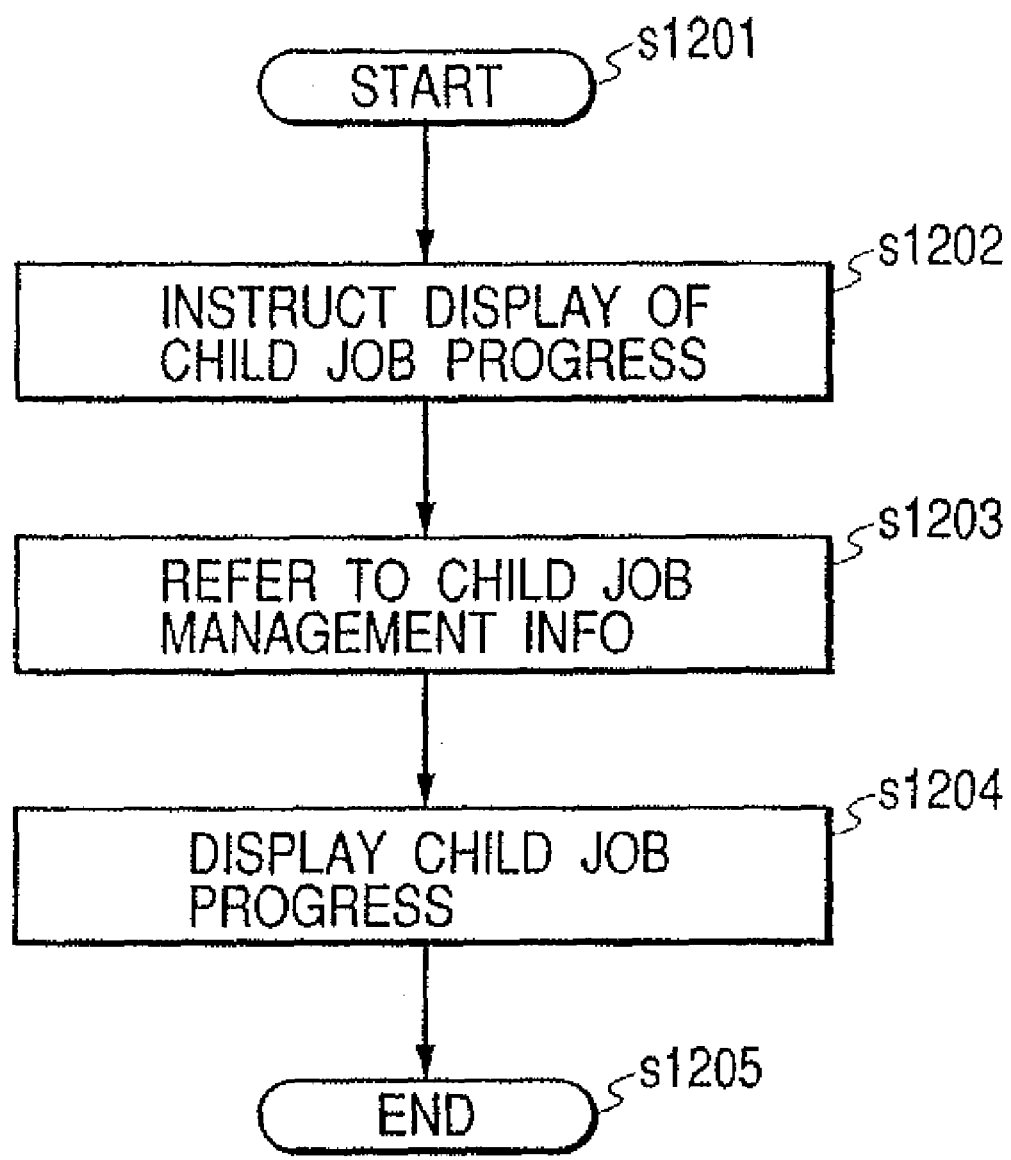
FIG. 12 is a flow chart showing a sequence for displaying a state of the job produced by the distributed print processing of the present invention as information relating to the original job.

FIG. 12 is a flow chart showing a sequence for displaying the status of the child print job by designating the parent print job.

In a step S1201, the processing in the flow chart of FIG. 12 is started. Such starting may be initiated at any condition so long as the parent print job exists. In a step S1202, for example, when instruction for "status display" (not shown) from the menu of UI by the operator via UI of the example 701 in FIG. 7 by designating the parent print job, in a step S1203, the CPU 200 refers the management information of the (distributed) plural child print jobs corresponding to the parent print job on the basis of the print control program. Upon referring, the job management information as explained in connection with FIG. 13 is utilized. Further, regarding this job management information, latest child job information is always reflected in the sequence shown in the flow chart of FIG. 11 and the information of the child print job deleted is also remained.

Figure 14:
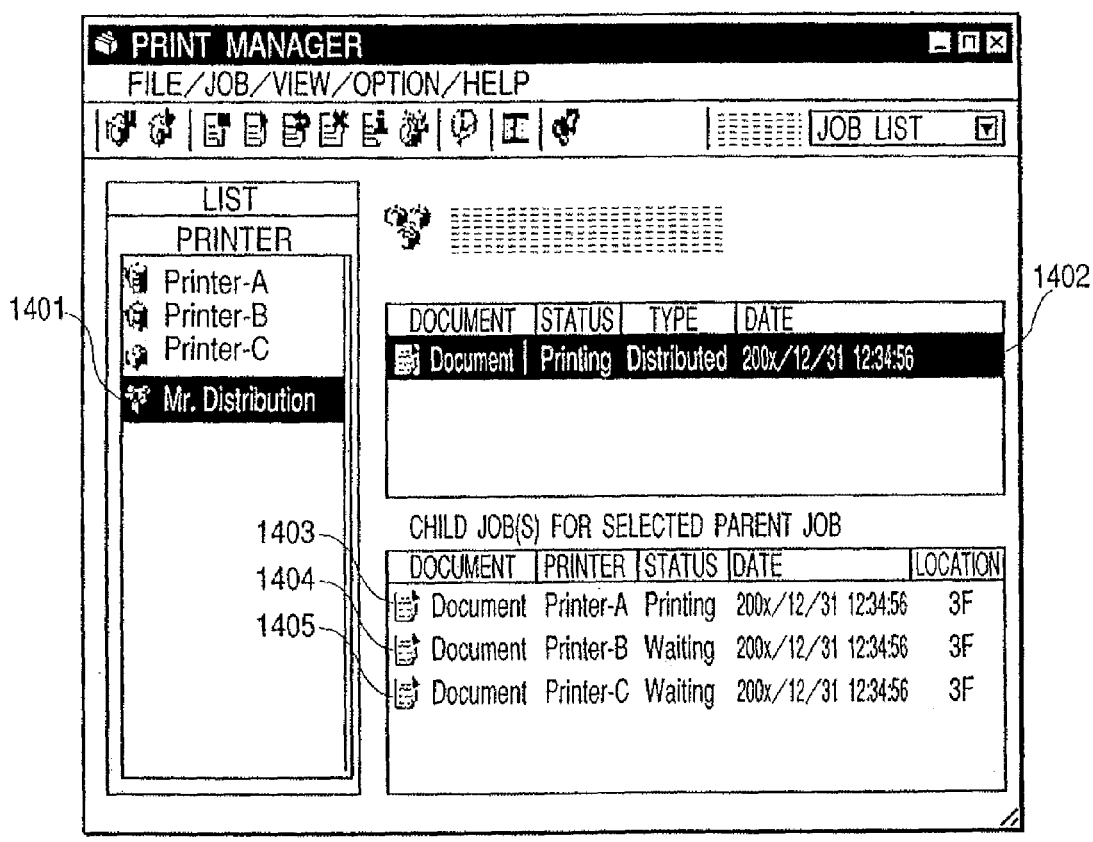
FIG. 14 is a view for showing an example of a displaying method provided by the program module (function) of the present invention.

Then, in a step S1204, the CPU 200 displays a list of job ID, document name, status, output recipient printer name and job division order such as (½) obtained from the management information on the basis of the print control program. By this sequence, the statuses of the plural child print jobs can be displayed together with the child print job information. Further, in the list, not only all of the child print jobs corresponding to the parent print job are displayed but also the parent print job which is a base of the child jobs is displayed. In this case, by providing "classification", the parent print job may be represented as "parent" and the child print job may be represented as "child" in a distinguishable manner. A user interface different from the interface of FIG. 7 in which the parent print job and the child print jobs are collectively displayed as the list is shown in FIG. 14. Printers A to C shown in the same frame as 1401 correspond to the printers by which the child print jobs are processed, and Mr. Distribution in 1401 indicates the printer corresponding to the parent print job. In Status (shown as "printing") in 1402, the status of the parent print job produced on the basis of the statuses corresponding to 1403 to 1404 is displayed. Although only one display corresponding to the parent print job is made in the frame as 1402, when a list regarding the plural parent print jobs is displayed in the frame 1402, the list of the child print jobs corresponding to the predetermined parent print job selected from the plural jobs is switched to the same frame in which 1403 to 1405 are displayed. Further, information as 1402 and information as 1403-1405 are not displayed collectively, but, as explained in connection with FIG. 7, the frames regarding the parent print job and the child print jobs may be displayed at a different timing. Incidentally, in FIG. 14, although three child print jobs are illustrated, it should be noted that the present invention can be applied to an arrangement in which, for example, 100 produceable child print jobs and a parent print job which is a base of the 100 child print jobs are displayed.

By the above-mentioned sequence, the operation and display of the present invention can be realized.

In the illustrated embodiment, while an example that the operation of PC is effected on the OS of the Windows was explained, any device such as other OS or PC can be used so long as one job is outputted from a plurality of output devices in spool systems different with respect to the plural output devices or in a device capable of effecting printer control.

In the present invention, the print data intended by the operator is handled as one job, and, when new plural jobs are produced from the print data, for example, even if the print data is divided or even if the number of parts or number of pages is increased by copying, the present invention can be applied.

After the new jobs are produced by the distributed print processing, only the management information of the original job exists, and similar function may be provided by deleting the print data.

Application range of the operation and display of the job of the present invention is not limited to the display of a host computer until the job is transferred to the printer, but can be applied to all circumstances in which the job is spooled in the printer or at least one of job, print data and job management information such as print processing job or sheet discharge confirmation waiting job.

Incidentally, the present invention can be applied to a system constituted by a plurality of equipments (for example, a host computer, interface equipment, reader, printer and the like) or a system comprised of a single device (a copying machine, printer, facsimile and the like).

Further, the object of the present invention can be achieved by reading-out and executing a program code of a software for realizing the function of the illustrated embodiment stored in a storing medium by means of a computer (or CPU or MPU) of a system or a device.

In this case, the program code itself read out from the storing medium realizes the function of the illustrated embodiment, and, thus, the storing medium storing such program code or the program code itself constitutes the present invention.

As the storing medium for storing the program code, for example, a floppy disk, a hard disk, an optical disk, a photo-magnetic disk, MO, CD-ROM, CD-R, DVD, a magnetic tape, a non-volatile memory card or ROM can be used.

Further, it should be noted that the present invention includes a concept that not only the functions of the above-mentioned embodiments are realized by executing the program code read out by means of the computer, but also OS (operating system) running on the computer executes the actual processing partially or totally on the basis of instruction of the program code to realize the functions of the embodiments.

Further, it should be noted that the present invention includes a concept that, after the program code read out from the recording medium is written in a memory of a function expansion board inserted into the computer or a function expansion unit connected to the computer, a CPU of the function expansion board or of the function expansion unit executes the actual processing partially or totally on the basis of instruction of the program code to realize the functions of the embodiments.

As mentioned above, according to the present invention, a plurality of child print jobs corresponding to a plurality of parent print jobs can be produced from the print data on the basis of the instruction of the distributed print inputted by the operator, and the plural child print jobs produced in accordance with the control of the distributed print and the parent print job which is a base of the plural child print jobs can be displayed in a distinguishable manner. Further, since the plural child print jobs corresponding to the parent print job are operated similarly in accordance with the operation instruction for the parent print job, the parent print job which is recognized as the single distributed print job by the operator can be displayed, and, further, the arrangement in which the display and operation of the distributed print job can easily be understood by the operator can be provided.

Further, the processing to be operated can be controlled correctly in accordance with the operation of the displayed print jobs (parent print job and child print jobs).

What is claimed is:

1. A distribution printing system that controls distribution printing, comprising:
    a child job controller that controls generating of a plurality of child jobs for a plurality of printers based on intermediate data generated as a parent job in accordance with application data, in response to input of an instruction for distribution printing;
    an output controller that controls outputting each of the plurality of child jobs to a corresponding one of the plurality of printers; and
    a display controller that causes a display unit to display a status of the parent job, wherein said display controller causes the display unit to display an output status of the parent job as the status of the parent job before any one of the plurality of child jobs is generated, and causes the display unit to change displaying of the status of the parent job based on at least one of the plurality of child jobs after the at least one child job is generated.

2. A system according to claim 1, further comprising a deletion controller that controls deletion of the parent job after deleting the plurality of child jobs, when deletion of the parent job is instructed, wherein if any one of the plurality of child jobs cannot be deleted, said deletion controller controls deletion such that the parent job is deleted even if the plurality of child jobs are not deleted.

3. A system according to claim 1, further comprising a deletion controller that controls deletion of the plurality of child jobs and the parent job, wherein when deletion of one of the plurality of child jobs is instructed via an operation instruction screen, said deletion controller deletes the one child job, without deleting the parent job, if another of the plurality of child jobs is present, and deletes the one child job and the parent job, if no other ones of the plurality of child job are present.

4. A system according to claim 1, further comprising:
    an additional output controller that controls outputting of the plurality of child jobs to a first print queue and a second print queue from which data are to be output to a first printer and a second printer, respectively; and
    a deletion controller that when deletion of the parent job is instructed, deletes the respective child jobs retained in the first and second print queues.

5. A system according to claim 4, wherein if the plurality of child jobs have been output to the first and second printers via the first and second print queues, respectively, said deletion controller controls the first and second printers to delete the child jobs retained therein.

6. A system according to claim 1, further comprising a deletion controller that controls the first and second printers to delete the plurality of child jobs that have been output to the first and second printers via first and second print queues, respectively, when deletion of the parent job is instructed.

7. A method of controlling distribution printing, comprising:
    a generating step of generating of a plurality of child jobs for a plurality of printers based on intermediate data generated as a parent job in accordance with application data, in response to input of an instruction for distribution printing;
    an output step of outputting each of the plurality of child jobs to a corresponding one of the plurality of printers; and
    a display step of causing a display unit to display a status of the parent job, wherein said display step causes the display unit to display an output status of the parent job as the status of the parent job before any one of the plurality of child jobs is generated, and causes the display unit to change displaying of the status of the parent job based on at least one of the plurality of child jobs after the at least one child job is generated.

8. A method according to claim 7, further comprising a deletion step of deleting the parent job after deleting the plurality of child jobs, when deletion of the parent job is instructed, wherein if any one of the plurality of child jobs cannot be deleted, the parent job is deleted even if the plurality of child jobs are not deleted.

9. A method according to claim 7, further comprising a deletion step of deleting of the plurality of child jobs and the parent job, wherein when deletion of one of the plurality of child jobs is instructed via an operation instruction screen, said deletion step deletes the one child job, without deleting the parent job, if another of the plurality of child jobs is present, and deletes the one child job and the parent job, if no other ones of the plurality of child job are present.

10. A method according to claim 7, further comprising:
    an additional outputting step of outputting of the plurality of child jobs to a first print queue and a second print queue from which data are to be output to a first printer and a second printer, respectively; and
    a deletion step of, when deletion of the parent job is instructed, deleting the respective child jobs retained in the first and second print queues.

11. A method according to claim 10, wherein if the plurality of child jobs have been output to the first and second printers via the first and second print queues, respectively, said deletion step controls the first and second printers to delete the child jobs retained therein.

12. A method according to claim 7, further comprising a deletion step that controls the first and second printers to delete the plurality of child jobs that have been output to the first and second printers via first and second print queues, respectively, when deletion of the parent job is instructed.

13. A computer program stored in a computer-readable medium for controlling distribution printing, comprising:
    generating code for generating of a plurality of child jobs for a plurality of printers based on intermediate data generated as a parent job in accordance with application data, in response to input of an instruction for distribution printing;
    outputting code for outputting each of the plurality of child jobs to a corresponding one of the plurality of printers; and
    display code for causing a display unit to display a status of the parent job, wherein said display code causes the display unit to display an output status of the parent job as the status of the parent job before any one of the plurality of child jobs is generated, and causes the display unit to change displaying of the status of the parent job based on at least one of the plurality of child jobs after the at least one child job is generated.

14. A computer program stored in a computer-readable medium according to claim 13, further comprising deletion code that controls deletion of the parent job after deleting the plurality of child jobs, when deletion of the parent job is instructed, wherein if any one of the plurality of child jobs cannot be deleted, said deletion controller controls deletion such that the parent job is deleted even if the plurality of child jobs are not deleted.

15. A computer program stored in a computer-readable medium according to claim 13, further comprising deletion code that controls deletion of the plurality of child jobs and the parent job, wherein when deletion of one of the plurality of child jobs is instructed via an operation instruction screen, said deletion code deletes the one child job, without deleting the parent job, if another of the plurality of child jobs is present, and deletes the one child job and the parent job, if no other ones of the plurality of child job are present.

16. A computer program stored in a computer-readable medium according to claim 13, further comprising:
  additional output code for additionally outputting the plurality of child jobs to a first print queue and a second print queue from which data are to be output to a first printer and a second printer, respectively; and
  deletion code for, when deletion of the parent job is instructed, deleting the respective child jobs retained in the first and second print queues.

17. A computer program stored in a computer-readable medium according to claim 16, wherein if the plurality of child jobs have been output to the first and second printers via the first and second print queues, respectively, said deletion code controls the first and second printers to delete the child jobs retained therein.

18. A computer program stored in a computer-readable medium according to claim 13, further comprising deletion code that controls the first and second printers to delete the plurality of child jobs that have been output to the first and second printers via first and second print queues, respectively, when deletion of the parent job is instructed.

19. A computer-readable medium storing a computer program for a distribution printing system that controls distribution printing, comprising:
  child job code that controls generating of a plurality of child jobs for a plurality of printers based on intermediate data generated as a parent job in accordance with application data, in response to input of an instruction for distribution printing;
  output code that controls outputting each of the plurality of child jobs to a corresponding one of the plurality of printers; and
  display code that causes a display unit to display a status of the parent job, wherein said display code causes the display unit to display an output status of the parent job as the status of the parent job before any one of the plurality of child jobs is generated, and causes the display unit to change displaying of the status of the parent job based on at least one of the plurality of child jobs after the at least one child job is generated.

* * * * *